United States Patent [19]

Hanai et al.

[11] 4,201,110
[45] May 6, 1980

[54] HUB NUT WITH WASHER

[75] Inventors: Kiyoshi Hanai, Toyota; Toshio Sugiura, Nishio, both of Japan

[73] Assignees: Toyota Jidosha Kogyo Kabushiki Kaisha, Toyota; Sugiura Seisakusho Co. Ltd., Nishio, both of Japan

[21] Appl. No.: 850,050

[22] Filed: Nov. 9, 1977

[30] Foreign Application Priority Data

Dec. 29, 1976 [JP] Japan .................. 51/177808[U]

[51] Int. Cl.² ............... F16B 37/00; F16B 43/00; B23P 19/08
[52] U.S. Cl. .................. 85/32 R; 10/155 R; 85/35; 85/50 R
[58] Field of Search ........... 85/32 R, 50 R, 35; 10/155 R

[56] References Cited

U.S. PATENT DOCUMENTS

| | | | |
|---|---|---|---|
| 1,652,648 | 12/1927 | Swangren | 85/50 R |
| 1,830,787 | 11/1931 | Ferry | 85/35 X |
| 2,017,493 | 10/1935 | Glowacki | 85/50 R |
| 3,298,272 | 1/1967 | Henderson | 85/53 |
| 3,480,306 | 11/1969 | Hsu | 85/50 R |
| 3,777,796 | 12/1973 | Takano | 85/50 R |

FOREIGN PATENT DOCUMENTS

| | | | |
|---|---|---|---|
| 1011729 | 4/1952 | France | 85/32 R |
| 448468 | 5/1949 | Italy | 85/32 R |
| 50-43641 | 12/1975 | Japan | 85/32 R |
| 51-124573 | 10/1976 | Japan | 85/32 R |
| 1389976 | 4/1975 | United Kingdom | 85/32 R |

*Primary Examiner*—Thomas J. Holko
*Attorney, Agent, or Firm*—Oblon, Fisher, Spivak, McClelland & Maier

[57] ABSTRACT

A hub nut with a washer, characterized in that an annular band of alternating ridges and grooves is formed by knurling circumferentially a part of the outer surface of a cylindrical part projectingly provided on the nut base and a washer with at least partially an inner diameter smaller than the outer diameter of the ridges of the knurled part is press-fitted thereover between the nut base and the knurled part.

3 Claims, 3 Drawing Figures

HUB NUT WITH WASHER

BACKGROUND OF THE INVENTION

1. Field of the Invention

The present invention relates to a hub nut with a washer and which is designed to prevent the slipping out or loss of the washer.

2. Description of the Prior Art

The hub nut is a hub-tightening means for an automobile wheel. Conventionally, the nut and the washer are separately provided, but they are troublesome for assembling, and the washer is therefore liable to be lost. For these reasons, recently a hub nut with a washer non-slippably attached thereto has come to be used often.

Hub nuts of this kind are disclosed in the Japanese Utility Model Application Nos. Sho 50-46269 (Laying-open No. Sho 51-124573) and Sho 47-98059 (Publication No. Sho 50-43641). According to the manner in which the washer is attached to the nut, that may be broadly classified as the "shrink-fit" type, the "caulking" type and the "press-fit" type, but they have the following drawbacks.

In the shrink-fit type, a cylindrical part is projectingly formed on the nut base, and on the outer surface of the cylindrical part is cut an annular groove. A washer, with an inner diameter smaller than the outer diameter of the cylindrical part and larger than the outer diameter of the annular groove, is heated enough to make the inner diameter thereof larger than the outer diameter of the cylindrical part, and the washer in its heated state is fitted into the groove and thereafter cooled to the ambient temperature, thereby preventing the washer from slipping out of the nut. This type, however, has drawbacks in that the outer diameter of the cylindrical part and the inner diameter of the washer have to be highly accurate and heating is needed for fitting the washer.

In the caulking type, a cylindrical part is projectingly formed on the nut base, and on the outer surface of the cylindrical part an annular groove is cut. A washer, with an inner diameter larger than the outer diameter of the cylindrical part is fitted into the groove and, in this state, the washer is caulked at several spots inwards in the radial direction, thereby forming a radially inwardly projecting part. This projecting part is extended into the groove, thus preventing the washer from slipping out of the nut. This type, however, has drawbacks in that the grooves in the outer diameter of the cylindrical part must be provided by cutting, and when the caulked projecting part is too large, the washer refuses to turn therein.

In the press-fit type, a cylindrical part is projectingly formed on the nut base, and a tapered projecting part is formed on the outside of the cylindrical part at a position separated by the width of the washer from the nut base such that the diameter may gradually increase in the direction of fitting the washer. An annular groove, with an outer diameter smaller than the outer diameter of the cylindrical part, is formed on the cylindrical part between the projecting part and the nut base, and a washer, with an inner diameter larger than the outer diameter of the groove and smaller than the outer diameter of the tapered projecting part, is press-fitted over the tapered projecting part into the groove of the nut, thereby preventing the washer from slipping out of the nut. This type, however, has drawbacks in that the cylindrical part, the tapered projecting part and the annular groove must be provided by cutting, and the portion of the tapered projecting part which interferes with the disc wheel to be fitted with a nut to be beveled, thereby increasing the work steps. Such beveling also is likely to increase the surface pressure of the light alloy disc wheel, thereby causing slackness.

SUMMARY OF THE INVENTION

The main object of the present invention is therefore to provide a hub nut with a washer, free from the above-mentioned drawbacks, which can be manufactured only by cold working and simple knurling, without cutting.

Another object of the present invention is to provide a hub nut with a washer of the press-fit type, which permits smooth fitting of the washer by pressing.

Still another object of the present invention is to provide a hub nut with a washer which needs no beveling of the disc wheel.

BRIEF DESCRIPTION OF THE DRAWINGS

Various other objects, features and attendant advantages of the present invention will be more fully appreciated as the same becomes better understood from the following detailed description when considered in connection with the accompanying drawings, in which.

DESCRIPTION OF THE PREFERRED EMBODIMENT

Figure 1:
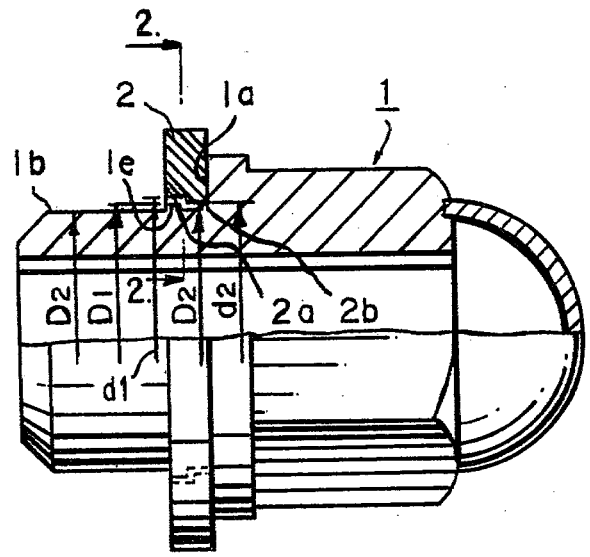
FIG. 1 is a front elevation view, showing in section the upper half of a hub nut, with a washer, according to the present invention.
Figure 2:
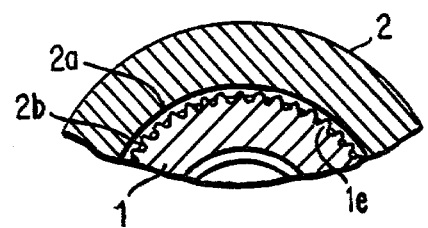
FIG. 2 is a cross-sectional view taken along the line 2—2 of FIG. 1.
Figure 3:
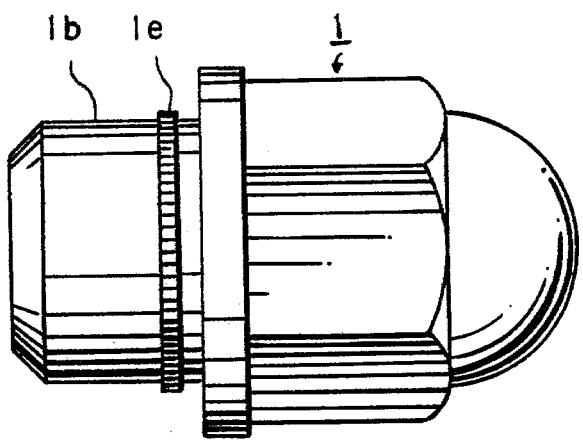
FIG. 3 is a front elevation view showing the hub nut without the washer of FIG. 1.

In FIGS. 1-3, illustrating a hub nut with a washer according to the present invention, there is shown a nut 1 which has been cold-worked. The nut is, for example, hexagonally formed and from the nut base 1a, against which a tightening piece is pressed, there is projectingly formed a cylindrical part 1b. The nut 1 is provided centrally with a female-threaded hole to receive a male-threaded means to screw the nut.

A portion of the outer surface of the cylindrical part 1b is knurled circumferentially to form an annular ridge-groove portion 1e thereon. Since the ridge-groove portion 1e is formed by knurling, the outer diameter $D_1$ of the ridges 1e' thereof is larger than the outer diameter $D_2$ of the non-knurled main portion 1b of the cylindrical part, while the outer diameter of the grooves 1e formed between such ridges in the knurled portion 1e is smaller than the outer diameter $D_2$ of the non-knurled main portion 1b of the cylindrical part. The position of the annular knurled portion 1e in the axial direction of the nut is such that the knurled part is removed from the nut base 1a far enough to make it possible for at least one part of the inside surface of a washer 2 to come between the end of the knurled part on the side of the nut base 1a and the nut base 1a itself, within the groove provided between the nut base and the ridges of the knurled portion.

The washer 2 is usually made of common steel or brass, the inner diameter $d_2$ thereof being smaller than the outer diameter $D_1$ of the ridges in the knurled part 1e and larger than the outer diameter $D_2$ of the non-knurled or portion 1b of the cylindrical part of the nut.

The washer 2 is thus fitted to the nut 1 in such a manner that at least one part of its inside surface, according to the washer configuration, may come between the knurled portion 1e and the nut base 1a, and this fitting is done by pressing the washer 2 over the knurled portion. Thereby, the projecting part, with unevenness, can very easily clear the ridges of the knurled portion 1e. The washer 2, after clearing the knurled portion 1e is freely rotatable in the groove provided by the cylindrical part between the nut base 1a and the ridges of the knurled portion, but it is prevented by the ridges themselves of the knurled portion from slipping out of the nut 1.

Thus, the inner part of the washer may be plastically deformed at the time of press-fitting it over the ridges of the annular knurled part, in which case the elastically deformed portion of the washer will spring back at least partially toward its original state after the washer has cleared the ridges. Accordingly, the washer will then be unable to slip out of the groove formed by the cylindrical part of nut 1 between the nut base 1a and the ridges.

On the other hand, if fitting were accomplished by shearing, rather than by plastic deformation, in which case the washer were sheared on its inner part by the ridges of the knurled part, the washer would still not slip out if the force to overcome the abrasion resistance were not applied at the time the washer were to be taken out.

When the end of the knurled part 1e on the side of the nut base 1a is separated by only a distance smaller than the width of the washer 2 from the nut base 1a, the inside surface of the washer 2 interferes with the ridges of the knurled portion 1e. Therefore, the inside surface of the washer 2 must be stepped, so that the inner diameter $d_1$ of the interfering part thereof with the ridges may be made larger than the outer diameter $D_1$ of the ridges in the knurled portion 1e. Thus, an indicated in FIGS. 1 and 2, the inside surface of the washer 2 represents a stepped surface consisting of the portion 2a corresponding to the knurled portion, with an inner diameter $d_1$ being larger than the outer diameter $D_1$ of the ridges of the knurled portion 1e, and of the portion 2b located between the knurled portion 1e and the nut base 1a, with an inner diameter $d_2$ being smaller than the outer diameter $D_1$ of the ridges of the knurled portion 1e and larger than the outer diameter $D_2$ of the main cylindrical part 1b. When the end of the knurled portion 1e on the side thereof opposite the nut base 1a is separated from the nut base 1a by a distance smaller than the width of the washer 2, the knurled portion 1e obviously will be covered by the washer 2 and will not extend out from the washer 2, and therefore the disc wheel need not be beveled.

When the disc wheel of an automobile is fitted to a hub, using a hub nut with a washer thus constituted, the trouble in fitting the washer to the nut 1 will be saved and the washer will be prevented from slipping out of the nut 1 and getting lost.

The hub nut, with a washer according to the present invention, yields the following effects.

First, the nut is formed by cold-working and the ridges are formed by knurling. Thus, the nut needs no cutting work, which takes much time and labor, thereby simplifying the manufacture and reducing the cost.

Second, the anti-slip projection for the washer is provided by a knurled, or alternating ridged and grooved, annular portion. Therefore, the washer can smoothly clear the knurled portion, or ridges thereof. Thus, the attaching of the washer to the nut is facilitated.

Third, when the inside surface of the washer is stepped and the ridges of the knurled portion are held within the inside surface of the washer, the beveling of the disc wheel, which is to be fitted to the hub, will be rendered needless.

Obviously, modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A hub nut with a washer, comprising:
    a nut having a base upon which a cylindrical part is formed, said cylindrical part having an internally threaded longitudinal opening therein;
    an annular band formed on the outside of said cylindrical part and adjacent to, but separated from, said base, said band providing alternating ridges of a diameter greater than said cylindrical part and grooves of a diameter smaller than said cylindrical part; and
    a washer having a stepped inside surface, the larger diameter stepped portion of said washer being larger than said diameter of said ridges and the smaller diameter stepped portion of said washer being smaller than said diameter of said ridges, said smaller diameter stepped portion being press fitted over said ridges of said band and being entirely located about the portion of said cylindrical part existing between said band and said nut base, said washer being freely rotatably about said hub nut.

2. A hub nut with a washer as set forth in claim 1, wherein said ridges and grooves of said annular band are formed by knurling.

3. A hub nut with a wawher as set forth in claim 2, wherein the end of said knurled part on the side opposite from said nut base is separated from said nut base by a distance equal to or smaller than the thickness of said washer.

* * * * *